US012789748B2

(12) United States Patent
Subramanian et al.

(10) Patent No.: US 12,789,748 B2
(45) Date of Patent: Nov. 10, 2026

(54) COMMANDING AN ACTION OF A VEHICLE

(71) Applicant: Valeo Telematik und Akustik GmbH, Friedrichsdorf (DE)

(72) Inventors: Muthukumar Subramanian, Friedrichsdorf (DE); Vishnu Amachandran, Friedrichsdorf (DE); Sandeep Sunil, Friedrichsdorf (DE); Prajnya Bharati, Friedrichsdorf (DE); Shaikh-Zaed Faizan, Friedrichsdorf (DE)

(73) Assignee: Valeo Telematik und Akustik GmbH, Friedrichsdorf (DE)

( * ) Notice: Subject to any disclaimer, the term of this patent is extended or adjusted under 35 U.S.C. 154(b) by 9 days.

(21) Appl. No.: 18/939,803

(22) Filed: Nov. 7, 2024

(65) Prior Publication Data

US 2025/0153682 A1 May 15, 2025

(30) Foreign Application Priority Data

Nov. 10, 2023 (EP) .................................... 23209150

(51) Int. Cl.

| | |
|---|---|
| ***B60R 25/24*** | (2013.01) |
| ***B60R 25/01*** | (2013.01) |
| ***B60R 25/102*** | (2013.01) |
| ***B60R 25/25*** | (2013.01) |
| ***G10L 17/18*** | (2013.01) |
| ***G10L 17/22*** | (2013.01) |

(52) U.S. Cl.

CPC .............. *B60R 25/24* (2013.01); *B60R 25/01* (2013.01); *B60R 25/102* (2013.01); *B60R 25/257* (2013.01); *G10L 17/18* (2013.01); *G10L 17/22* (2013.01); *B60R 2325/101* (2013.01)

(58) Field of Classification Search

CPC ....... B60R 25/24; B60R 25/01; B60R 25/102; B60R 25/257; B60R 2325/101; B60R 16/0373; G10L 17/18; G10L 17/22; G10L 2015/223; G10L 15/22; G06F 3/167; G07C 9/00563

See application file for complete search history.

(56) References Cited

U.S. PATENT DOCUMENTS 6,424,056 B1 7/2002 Irvin
2003/0231550 A1 12/2003 Macfarlane (Continued)

FOREIGN PATENT DOCUMENTS

WO 2021/130689 A1 7/2021

OTHER PUBLICATIONS

Extended European Search Report issued in corresponding European Patent Application No. 23209150.4 mailed May 21, 2024 (7 pages).

*Primary Examiner* — Anne Marie Antonucci
*Assistant Examiner* — Patrick Daniel Mohl
(74) *Attorney, Agent, or Firm* — Osha Bergman Watanabe & Burton LLP

(57) ABSTRACT

A method of commanding an action of a vehicle with a key-fob of the vehicle communicatively connected to the vehicle. The method includes receiving a voice command at a microphone of the key-fob. The method also includes, by the key-fob, transmitting to the vehicle a signal associated to the voice command. The method also includes, by the vehicle, upon receiving the signal associated to the voice command from the key-fob, performing a corresponding action.

11 Claims, 4 Drawing Sheets

(56) References Cited

U.S. PATENT DOCUMENTS

| | | | |
|---|---|---|---|
| 2004/0143437 | A1 | 7/2004 | Hanood |
| 2004/0222899 | A1 | 11/2004 | Yezersky et al. |
| 2017/0019480 | A1 | 1/2017 | Yokota et al. |
| 2020/0047687 | A1* | 2/2020 | Camhi .................... G10L 15/22 |
| 2021/0174793 | A1* | 6/2021 | Grgac ................ G07C 9/00309 |
| 2023/0182686 | A1 | 6/2023 | Freund et al. |

* cited by examiner

COMMANDING AN ACTION OF A VEHICLE

TECHNICAL FIELD

The disclosure relates to the field of vehicle engineering, and more specifically to a method for commanding an action of a vehicle, and to a key-fob, a vehicle and a system configured for performing such a method.

BACKGROUND

A number of systems and programs are offered on the market for controlling one or more actions on a vehicle in an ergonomic manner, for example unlocking the doors of the vehicle. Existing systems mostly rely on using devices such as key-fobs that are communicatively connected to a vehicle and allow for interacting with the vehicle, typically by pressing buttons mounted on the key-fobs and thereby sending corresponding signals to the vehicle from a distance, each button or combination/sequence of buttons and its corresponding signal being associated to a corresponding action performed by the vehicle.

Within this context, there is still a need for an improved method for commanding an action of a vehicle.

SUMMARY

It is therefore provided a method of commanding an action of a vehicle with a key-fob of the vehicle communicatively connected to the vehicle. The method comprises receiving a voice command at a microphone of the key-fob. The method also comprises, by the key-fob, transmitting to the vehicle a signal associated to the voice command. The method further comprises, by the vehicle, upon receiving the signal associated to the voice command from the key-fob, performing a corresponding action.

The method may comprise one or more of the following:

- the action comprises at least one of an ignition, a parking, a door locking and/or a door unlocking;
- the method comprises, by the key-fob or by the vehicle, determining an actuation signal which commands the corresponding action;
- the determination of the actuation signal comprises applying a neural network configured to receive as input the signal and to output the actuation signal;
- the determination of the actuation signal comprises applying, by the key-fob, a deterministic algorithm;
- the method comprises executing a voice recognition to authenticate a person providing the voice command;
- the voice recognition is performed by the key-fob, the method transmitting the signal to the vehicle upon determining that the voice command stems from an authorized person;
- the method further comprises outputting a feedback signal upon determining that the voice command stems from an authorized person and/or upon determining the actuation signal, the feedback signal comprising at least one of: activating one or more LEDs placed on the vehicle and/or one or more LEDs placed on the key-fob, and outputting a sound from the vehicle and/or a sound from the key-fob; and/or
- the voice command is provided by a person located outside the vehicle, and/or the transmitting of the signal to the vehicle is performed via Bluetooth.

It is further provided a key-fob communicatively connected to a vehicle and configured for performing the above method. The key-fob comprises a microphone configured to receive the voice command. Optionally, the key-fob further comprises a button configured for activating and/or stopping the reception of the voice command.

It is further provided a vehicle configured for performing the method.

It is further provided a system comprising the above key-fob and the above vehicle, the system being configured for performing the method.

BRIEF DESCRIPTION OF THE DRAWINGS

Non-limiting examples will now be described in reference to the accompanying drawings, where.

DETAILED DESCRIPTION

Figure 1:
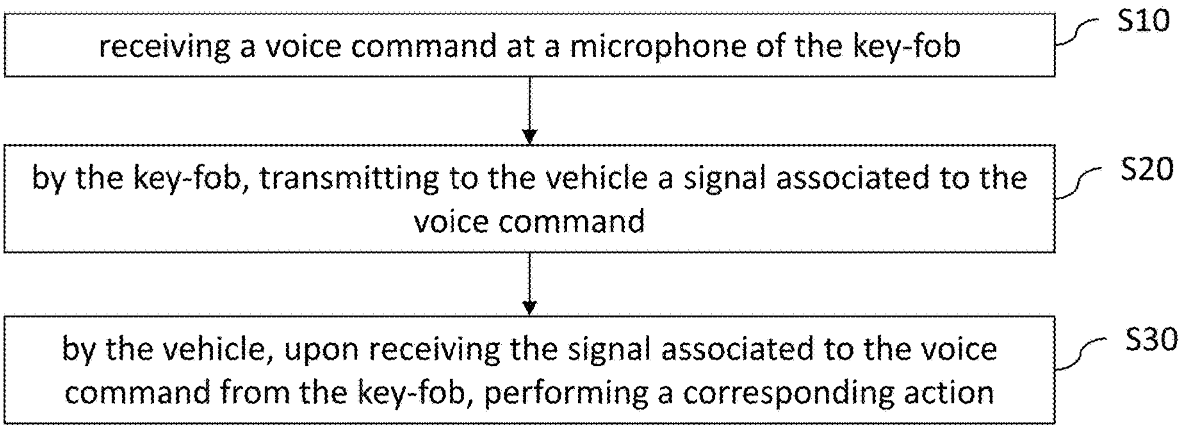
FIG. 1 shows a flowchart of an example of the method.

With reference to FIG. 1, it is proposed a method of commanding an action of a vehicle with a key-fob of the vehicle. The key-fob is communicatively connected to the vehicle. The method comprises receiving S10 a voice command at a microphone of the key-fob. The method also comprises, by the key-fob, transmitting to the vehicle a signal associated to the voice command. The method also comprises, by the vehicle, upon receiving the signal associated to the voice command from the key-fob, performing S30 a corresponding action.

Such a method forms an improved solution for command an action of the vehicle. Indeed, the use of the key-fob for commanding the vehicle results in a reliable and efficient manner for causing the vehicle to perform the action associated to the voice command. This is because the key-fob is communicatively and wirelessly connected to the vehicle, in contrast to other hypothetical complex devices such as smartphones which require a connection to a (external) telephone operator, which may not be always available. The key-fob is also natively connected to the vehicle, which means that it does not require the user to perform a coupling with the vehicle in order to send signals received and processed by the vehicle. In addition, the key-fob is a compact device, which results in reduced manufacturing costs. Indeed, the method can be efficiently implemented with available technology. As known in the art, the key-fob may comprise buttons for performing one of the actions, and further the method may allow the use of physical inserts as is the case with standard key-fobs. Moreover, in the case of the method, the microphone allows commanding the vehicle via a voice command of the user, that is, in a simple ergonomic manner as the method does not require pressing buttons classically used for performing one of the actions. In other words, no button or sequence of buttons of the key fob need to be pressed to perform the action, except optionally to activate a voice command mode, as discussed later. This is all thanks to the use of the microphone (on the key-fob) for triggering the execution of the action by the vehicle In examples, the method may be repeated with different voice commands, each time yielding a distinct corresponding action performed by the vehicle. The user need not learn specific button commands, as all these actions may be performed via voice commands.

It is also provided a key-fob communicatively connected to a vehicle and configured for performing the method. By "key-fob" it is meant a device comprising circuitry configured for sending instructions to the vehicle so as to perform one or more actions and may comprise a physical insert for interacting with the vehicle, for example for opening the door by inserting the physical insert on a lock or igniting the vehicle by inserting the physical insert on the ignition lock, e.g., located at a proximity of the steering wheel. The key-fob may comprise a casing configured to enclose the circuitry. Optionally, the casing may be configured to cover at least part of the physical insert. The casing may be configured for permitting rotating the physical insert on an axis or to allow the displacement of the physical insert along a longitudinal axis of the casing. The casing may be made of any material such as plastic. The key-fob comprises a microphone configured to receive the voice command. The microphone is configured to transmit an audio signal associated to the voice command to the circuitry of the key-fob. The key-fob may optionally comprise one or more LEDs placed over the casing. The one or more LEDs may be of a single color or of at least two colors, for example red and green. The key-fob may optionally comprise a speaker. The key-fob may comprise circuitry for sending instructions the one or more LEDs and/or the speaker, e.g., by indicating to activate the LEDs and/or the speaker that the voice command stems from an authorized person. The key-fob may have any dimensions suitable so as to be held in a single hand by the user, for example having a diameter (i.e. maximal length of a segment linking two points of the key-fob) of 10 cm or less.

The key-fob may further comprise a button (e.g., a push or press button) configured for activating and/or stopping the reception of the voice command. In other words, the button may be configured for sending electric signals to the circuitry of the key-fob for activating and/or stopping the reception of audio signals from the microphone. The button may be placed over the casing or may be covered by the casing by a removable cover. The key-fob may further comprise one or more other buttons (e.g., push or press button(s)) configured for controlling other function(s) of the key-fob.

A vehicle configured for performing the method may comprise a computer configured to perform the at least one action. In examples, the vehicle may comprise sensors such as one or more cameras placed on the exterior of the vehicle and/or proximity sensors configured for detecting the position of the vehicle relative to external objects. The vehicle may comprise one or more LEDs. The one or more LEDs may be placed anywhere on the vehicle, for example on at least one door of the vehicle or on the front of the vehicle or under the frame of the vehicle (also known as underglow LEDs in some systems). The vehicle may comprise a speaker. The computer may be configured for receiving the signal associated to the voice command from the key-fob, by receiving the audio signal from wireless communication.

The key-fob and the vehicle may be communicatively coupled via wireless communication such as radio, Wi-FI or Bluetooth (for instance Bluetooth Low-Energy), Zigbee or Z-Wave.

It is further provided a system comprising the key-fob and the vehicle. The key-fob and the vehicle may be communicatively coupled to one another. The system is configured for performing the method.

It is further provided a computer program for providing the method. The computer program may comprise instructions executable by the computer installed on the vehicle and the key-fob, the instructions comprising means for causing the above system to perform the method. The program may be recordable on any data storage medium, including the memory of the system. The program may for example be implemented in digital electronic circuitry, or in computer hardware, firmware, software, or in combinations of them. Method steps may be performed by a programmable processor installed on the vehicle executing a program of instructions to perform functions of the method performed by the vehicle for operating on input data and generating output. The processor may thus be programmable and coupled to receive the voice command data and instructions from the key-fob. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The method is for commanding an action of a vehicle with a key-fob of the vehicle. In other words, the method is for sending an instruction to the vehicle with the key-fob for performing the action. The action may comprise at least one of an ignition, a parking, a door locking and/or a door unlocking.

The key-fob is communicatively connected to the vehicle. In other words, the key-fob is configured to establish the transmission of one or more signals to the vehicle, for example via wireless communication such as Bluetooth, BLE, Zigbee or Z-Wave.

The method comprises receiving S10 a voice command at a microphone of the key-fob. The voice command is for performing a corresponding action on the vehicle. The voice command may be a phrase pronounced by the user (in English or in another language) that corresponds to an action by the vehicle.

The voice command may be provided by a person located outside the vehicle, and for example carrying the key-fob, e.g. in their hand or in a pocket of their clothes.

In examples, the voice command may be the phrase "start the car" for performing the action of igniting the car, the voice command may be the phrase "park the car" (or any other corresponding phrase in English or in another language) for performing the action of parking the car, the voice command may be the phrase "lock the doors" for performing the action of locking at least one door of the vehicle, the voice command may be the phrase "unlock the doors" (or any other corresponding phrase in English or in another language) for performing the action of unlocking at least one door of the vehicle.

The example voice commands are provided in English but the method is not limited to this language. In examples, the voice command may be in any language such as English or any other language such as Spanish, French and/or German. The voice command is not limited to this and may comprise any other language such as Italian and/or Russian. The method may comprise configuring the language of the voice command, for example setting a language (such as the English language and/or any other language) as a default language or changing the language of the voice command (e.g., changing the default language from English to French). Alternatively the system may be configured to operate with different languages, and the method may comprise recognizing the language being used.

Receiving the voice command S10 may comprise pressing a button on the key-fob configured for activating the voice command. The method may also comprise pressing again the button for stopping the reception of the voice command.

The method also comprises, by the key-fob, transmitting S20 to the vehicle a signal associated to the voice command.

The signal may be an audio signal corresponding to the voice command, or alternatively it may be an instruction associated to the voice command (in other words, interpretable to the vehicle as an instruction for performing an action associated to the voice command). In other words, the key-fob may transmit the voice command to the vehicle with no or little processing (i.e. such that the processing still results in an audio signal), or alternatively the key-fob may (locally) perform significant processing of the voice command, so as to convert it into another type of signal than an audio signal, for example to convert it into actuation signal. In examples, transmitting S20 the signal to the vehicle may be performed via radio, Wi-Fi, Bluetooth, BLE, Zigbee or Z-Wave.

The method may comprise, by the key-fob or by the vehicle, determining an actuation signal which commands the corresponding action. By "actuation signal" it is meant an instruction associated to the voice command for performing an action associated to the voice command. For example, the actuation signal causes the vehicle to command the ignition of the vehicle.

In case in which the determination is performed by the key-fob, the signal associated to the voice command corresponds to the actuation signal, the vehicle may directly cause the vehicle to perform the corresponding action. In the case in which the determination is performed by the vehicle, the key-fob transmits to the vehicle an audio signal, the determination of the actuation signal is thereby performed by the vehicle. The determination of the actuation signal may comprise performing processing with an algorithm (e.g., with a deterministic algorithm or an algorithm such as a neural network) on the audio signal associated to the voice command sent by the key-fob.

The method also comprises, upon receiving the signal associated to the voice command from the key-fob, performing S30 a corresponding action.

In examples, the action may consist of performing an ignition of the vehicle. In such a case, the user may be located outside or inside the vehicle and recite a voice command to be received by the key-fob corresponding to the ignition. The voice command may be for example: "start the car" or any corresponding phrase in English or in another language. Upon reception of the signal associated to the voice command, the computer mounted on the vehicle may perform the ignition of the vehicle by sending an ignition command.

In other examples, the action may consist of parking the vehicle. In such a case, a user may be located outside the vehicle and near a space such as a parking lot and recite a voice command to be received by the key-fob. Upon reception of the signal associated to the voice command, the computer mounted on the vehicle may perform an automatic parking into an available parking space of the parking lot, for example by automatically moving (by using for example an autopilot function) the vehicle to the available parking space obtaining camera data so as to determine whether the vehicle is correctly parked on the available parking space. The voice command may be for example "park the car" or any corresponding phrase in English or in another language.

In examples, the action may consist of performing door locking of the vehicle. In such a case, the user may be located outside the vehicle and recite a voice command to be received by the key-fob corresponding to the door locking. The voice command may be for example "lock the doors" or any corresponding phrase in English or in another language. Upon reception of the signal associated to the voice command, the computer mounted on the vehicle may lock least one door of the vehicle, for example the door of the vehicle for the driver and/or all of the doors.

In examples, the action may consist of performing door unlocking of the vehicle. In such a case, the user may be located outside or inside the vehicle and recite a voice command to be received by the key-fob corresponding to the door unlocking. The voice command may be for example "unlock the doors" or any corresponding phrase in English or in another language. Upon reception of the signal associated to the voice command, the computer mounted on the vehicle may unlock at least one door of the vehicle, for example all of the doors.

In other examples, the action may consist of performing a child lock.

The method thus results in a reliable and efficient manner for causing the vehicle to perform the action associated to the voice command, thanks to the specific way in which the key-fob is used for indicating the vehicle to perform the corresponding action. The key-fob is of low consumption, due to using wireless transmission such as Bluetooth (or similarly BLE, Zigbee or Z-Wave) and highly ergonomic, as the voice commands may assist a user to open the vehicle with reduced physical movements by the user, which is critical for people having physical impairments. The ergonomics of the key-fob are particularly advantageous when the key-fob lacks a physical insert.

The determination of the actuation signal may comprise applying (preferably by the vehicle) a neural network configured to receive as input the signal and to output the actuation signal.

The neural network is a computer-implemented/computerized data structure that is a set of layers of neurons defined by two features: topology and parameters (also known as weights). The topology may be a system of connected computing units. The weights may be numerical coefficients which are assigned to each connection. Each computing unit may output a weighted combination of a corresponding input numerical data and sends this result to neighboring computing units according to the connections. The neural network may comprise initial units which are fed by input data (that is, the signal) and terminal units which yields the output result (that is, the actuation signal). The topology of the network, in combination with the weights assigned to each connection, may establish the flow of data from the initial units all the way down to the terminal units. The weights of the network may be preset. In other words, the weight's values may have been adjusted according to a learning process. The neural network may have been trained on a dataset comprising voice commands associated with actuation signals.

The neural network is configured for outputting the actuation signal. That is, weights of the neural network are adjusted so that the output of the neural network is an actuation signal that corresponds to the signal that corresponds to the voice command.

In examples, the signal may be an audio signal. The neural network may be trained to recognize characters from the audio signal, for example, "start the car" (or any other corresponding phrase in English or in another language) and to determine that the signal corresponds to an ignition signal. In this case, the output of the neural network is an ignition signal for igniting the vehicle.

The method thus leverages from neural networks to determine the actuation signal. The application of the neural network is fast and accurate, as the training allows the neural network to achieve an accurate result.

The determination of the actuation signal may comprise applying a deterministic algorithm. By "deterministic" it is meant that the algorithm does not comprise any probabilistic or random component, excluding for example neural networks. The application may be performed by the key-fob. The deterministic algorithm may comprise performing character recognition on the received voice command. The output by the deterministic algorithm is the signal associated to the voice command in the form of the recognized characters. Upon reception of the signal, the method may perform searching on memory (having stored thereon, e.g., on a database), an action corresponding to the signal received from the key-fob. Alternatively, upon reception of the signal by the vehicle, the method may transmit the signal (from the vehicle) to a speech recognition software based on the cloud to convert into a text format. This allows a scalable implementation.

The determination of the actuation signal may comprise determining a wake word command. The wake word command may be any data authorizing the method to receive the signal associated to the voice command from the key-fob. This allows to reduce the determination of false positives, that is, voice commands not intended for performing a corresponding action, e.g., coming from environmental noise. In addition, this allows reducing processing load, as the determination of the actuation signal is only performed when detecting the wake word command.

The method may comprise executing a voice recognition to authenticate a person providing the voice command. By voice recognition it is meant any algorithm configured to extract one or more voice features (for instance a voice sample from the voice command, a pitch and/or accent) from the voice command. Authenticating the person may comprise comparing the extracted one or more features from the voice command with stored voice samples of one or more authorized persons. The method may determined that the voice command belongs to an authorized person when determining that the one or more voice features match substantially the stored voice samples.

The method may also comprise storing a person's voice to be recognized as an authorized person. The method may comprise recording the person's voice, e.g., by acquiring a voice sample from the key-fob or the vehicle. The method may comprise calibrating the voice sample so as to acquire a voice feature characteristic of the person's voice, e.g., accent and/or pitch. The method may store the voice sample as an authorized person.

The method may also comprise storing voice commands. In examples, the method may comprise, upon action by the user (e.g., through a user interface on the vehicle) recording a phrase by the user. The phrase may be associated with a corresponding predetermined action on the vehicle, thereby creating a new voice command. The new voice command may be stored on memory for performing the action on the vehicle by an authorized person. The method may also comprise calibrating the voice command, e.g., normalizing the volume to a certain decibel quantity.

The voice recognition may be performed by the key-fob. In other words, the method may execute the voice recognition to authenticate the person providing the voice command on the key-fob. The voice recognition may be performed with an algorithm stored on the key-fob. The algorithm may be a deterministic algorithm. The key-fob may comprise a memory configured to stored voice samples of one or more authorized persons. The method may transmit the signal to the vehicle upon determining that the voice command stems from an authorized person. In other words, the method may transmit the signal when determining that the voice command matches substantially one of the stored voice samples.

In examples, determining that the voice command stems from an authorized person comprises comparing the voice command with voice commands stored on the memory of the key-fob. The voice command may be calibrated with respect to a predetermined setting, e.g., predetermined decibel calibration. The method may determine if there is a substantial match between the voice command and the stored voice commands. If the method finds a substantial match, the method may indicate that the user is an authorized user and provide a feedback signal to the user indicative of the successful authentication, e.g., in the form of LED light mounted in the key-fob, the LED light may glow continuously. Alternatively, if the key-fob has an in-built speaker, the key-fob may output a sound indicative of a successful authentication, or an unsuccessful authentication, (for example a sound corresponding to the speech: unauthorized user, please initiate the command again). The method may allow to re-authenticate the user if the authentication is not successful (i.e., there is no match between the received voice command and the stored voice command). The method may allow a predetermined number of attempts, e.g., up to three authentication attempts. If, after the predetermined number of attempts the authentication is not successful, the method does not allow the user to ignite/actuate the car using voice command via key-fob, at least for a predetermined amount of time.

Thus, the method is highly ergonomic and portable, as the authentication is performed on the key-fob rather than in the vehicle. In case the algorithm is deterministic, the power consumption on the key-fob is low.

The method may comprise storing the voice command, e.g., on a memory (such as flash memory) installed on the key-fob. Thereby, the voice command may be kept for future authentication of the user. The memory may store at least one voice command for a respective user (e.g., three voice commands or more). The number of voice commands may be based on a predetermined configuration of the user.

The method may further comprise outputting a feedback signal upon determining that the voice command stems from an authorized person and/or upon determining the actuation signal. By "feedback signal" it is meant any analog or digital signal that causes the activation of at least one peripheral on the vehicle and/or on the key-fob to indicate (as a visual and/or acoustic indication) a user that the received voice command stems from an authorized person, thereby indicating that the vehicle is authorized to perform the corresponding action.

The feedback signal may comprise instructions for activating one or more LEDs placed on the vehicle. Additionally or alternatively, the feedback signal may comprise activating the one or more LEDs placed on the key-fob, for example at the same time when activating the one or more LEDs placed on the vehicle. The vehicle may send a notification to the key-fob to activate the one or more LEDs when the voice recognition is performed by the vehicle. The one or more LEDs placed on the key-fob may be of the same color as the one or more LEDs placed on the vehicle. This provides the user with visual feedback to indicate that the vehicle performs the corresponding action associated with the voice command.

The feedback signal may also comprise outputting a sound from the vehicle and/or a sound from the key-fob. The feedback signal may activate a speaker on the vehicle and/or the key-fob indicating whether the voice command stems from an authorized person. The sound may be any kind of sound, for example a tune or chirp, or even a synthesized voice, indicating for example "executing the action" when the voice command stems from an authorized person or indicating for example "cannot perform the action" when the method determines that the voice command does not stem from an authorized person, the corresponding action being thereby not performed.

The key-fob is thus configured to receive a signal from the vehicle such that the user is provided with an objective indicator of the action being performed by the vehicle. This further improves ergonomics.

Examples of the method are discussed below with reference to FIGS. 2 to 4.

An implementation of the method operates the vehicle by having a user (e.g., driver/owner) provide voice commands (speaking out loud phrases that correspond to voice commands).

A system comprising a key-fob and a vehicle may be auto trained with the user's voice, with their different vocal sound(s) and create a data set for better voice recognition.

The key-fob includes a microphone used to receive the voice command. The voice command is transmitted to the vehicle via any available protocol such as WIFI, Bluetooth (BT) or Bluetooth Low Energy (BLE), Zigbee or Z-Wave, for example as received (i.e. without being transformed in an actuation signal).

At the vehicle, the voice command may be recognized and authenticated by being compared with stored/available voice data (e.g., locally from an ECU storage or available from the cloud). If there is a match between the input voice and the stored/available voice data, then the method processes the voice command, e.g., in a command processing unit mounted to the vehicle to perform the corresponding action. If there is no match, the vehicle may transmit a negative response back to the key-fob as a signal. The key fob may comprise two led light indicators that are mounted in the key-fob which indicate the user about the successful/failure of the voice command. If red light glows from the LED, the key fob may indicate that the input voice command failed, and the green light glows from the LED only on a successful scenario.

Figure 2:
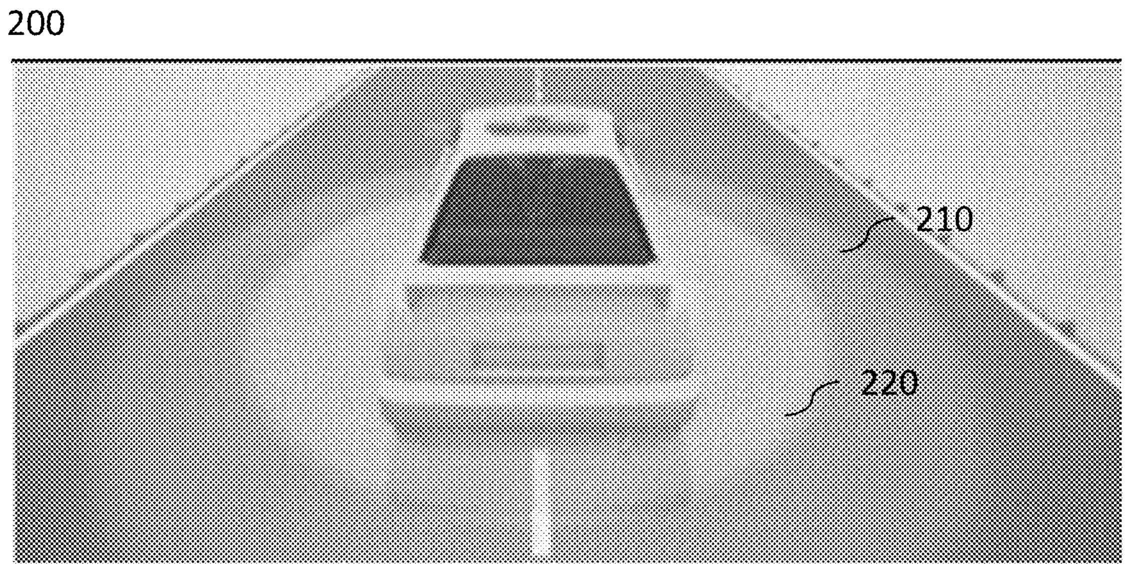
FIGS. 2 to 4 illustrate the method.

FIG. 2 illustrates an example of the vehicle.

The vehicle 200 may include sensors and LEDs 210, 220 that may respond after performing one of the actions. One of the voice commands used as an example to ignite the car is the command "Switch on the car", on receiving this command the car may be ignited automatically.

Another example command is "Park the vehicle" voice command; once a user is nearby the parking lot, the user may trigger the "park vehicle" voice command via the key fob. Upon successful validation of respective voice command, the vehicle may be auto parked into the available nearby parking lot with the help of cameras data and respond back to user after the successful parking.

Figure 3:
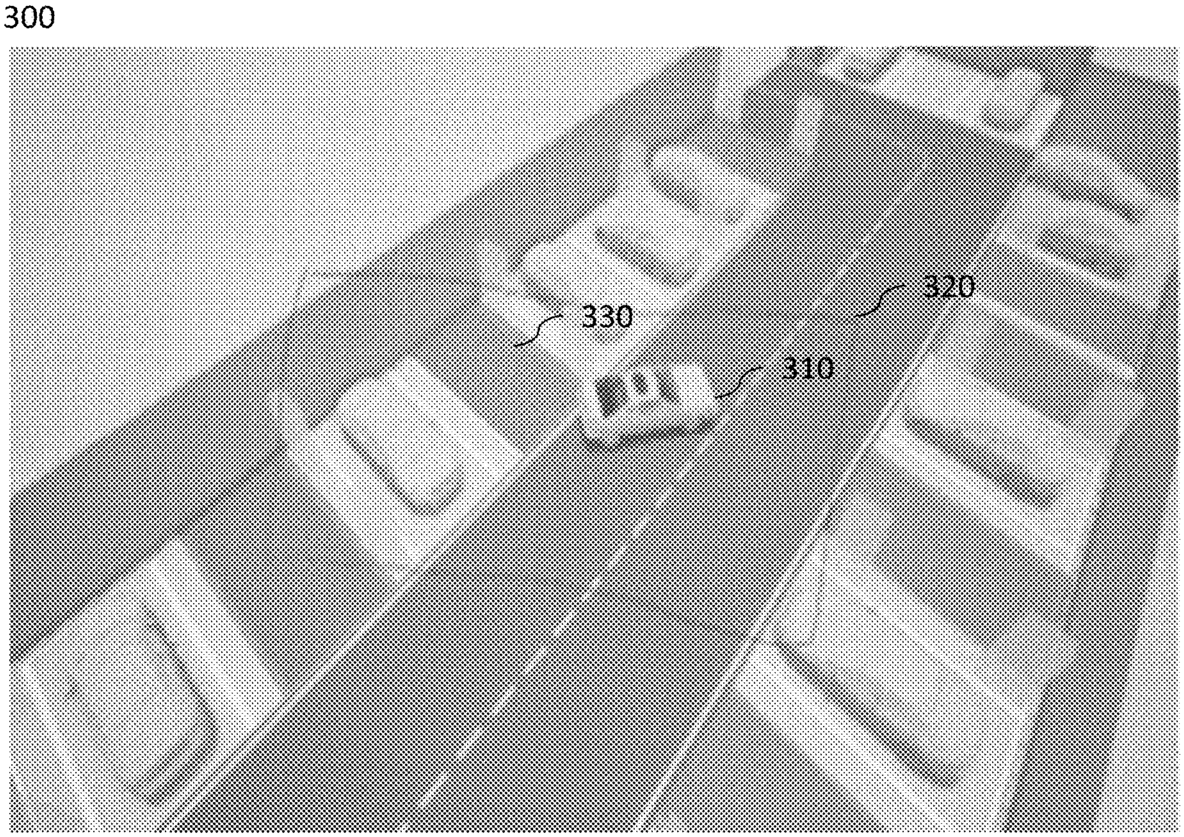

FIG. 3 illustrates the automatic parking 300 of the vehicle. The vehicle 310 comprises sensors and cameras for localizing the vehicle on it environment. The sensors and cameras may localize the vehicle around an area 320. The sensors and cameras may locate a vacant space 330. An autopilot feature may place the vehicle 310 on the space 330 upon reception of the command "Park the vehicle".

The method may also implement a "Wake Word Detection". The method may determine whether the user says one of the words the device may be programmed to require to turn on, so as to minimize false positives and false negatives. The detection may identify pronunciation differences. The detection may be performed by the vehicle.

If the wake word is detected, the signal may then be sent to the speech recognition software e.g. in the cloud, which takes the audio and converts it to text format. The output space may be expansive as it may look at all the words e.g. in the English language and/or any other language(s). The method may use cloud technology for efficient scaling.

Figure 4:
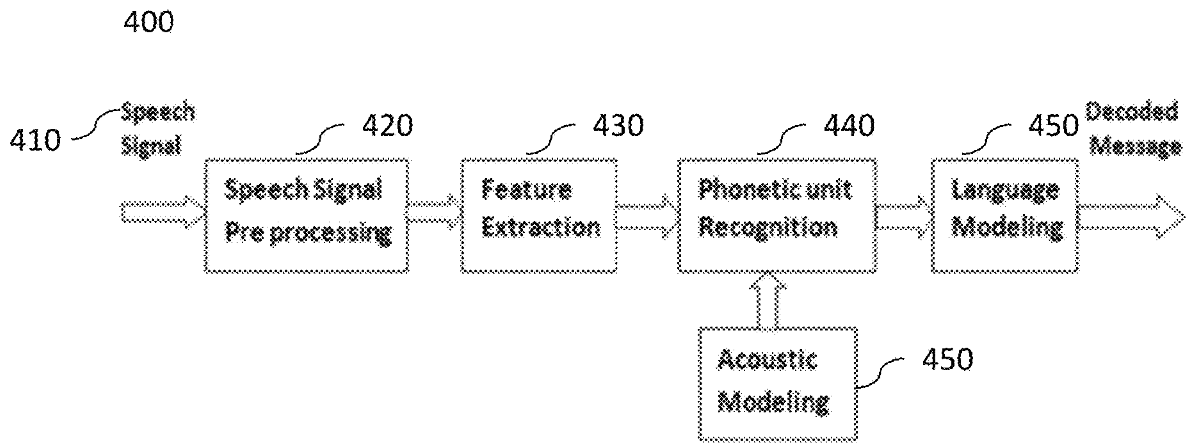

FIG. 4 illustrates a speech recognition pipeline 400 implemented by the method.

The speech recognition pipeline 400 may takes as input the voice command as a speech signal 410. The pipeline 400 may perform speech signal pre-processing 420, e.g., filtering of the voice command. The pipeline 400 may perform feature extraction 430 so as to extract features of the voice. The pipeline 400 may perform phonetic unit recognition 440 to recognize characters. The pipeline 400 may also include acoustic modeling 450. The pipeline 400 may perform language modeling 450 from the result of the phonetic unit recognition so as to output a decoded message.

The invention claimed is:

1. A method of commanding an action of a vehicle with a key-fob of the vehicle communicatively connected to the vehicle, the method comprising:
- receiving a voice command at a microphone of the key-fob;
- transmitting, by the key-fob, to the vehicle a signal associated to the voice command;
- performing, by the vehicle, a corresponding action upon receiving the signal associated to the voice command from the key-fob; and
- determining, by the key-fob, an actuation signal which commands the corresponding action,
- wherein determining the actuation signal comprises applying a neural network configured to receive as input the signal and to output the actuation signal.

2. The method of claim 1, wherein the action comprises at least one of an ignition, a parking, a door locking and/or a door unlocking.

3. The method of claim 1, wherein determining the actuation signal comprises applying, by the key-fob, a deterministic algorithm.

4. The method of claim 1, further comprising executing a voice recognition to authenticate a person providing the voice command.

5. The method of claim 4, further comprising transmitting the signal to the vehicle upon determining that the voice command stems from an authorized person, wherein the voice recognition is performed by the key-fob.

6. The method of claim 1, further comprising:
- outputting a feedback signal upon determining that the voice command stems from an authorized person and/or upon determining an actuation signal,
- wherein the feedback signal comprising at least one of:
  - activating one or more LEDs placed on the vehicle and/or one or more LEDs placed on the key-fob, and
  - outputting a sound from the vehicle and/or a sound from the key-fob.

7. The method of claim 1, wherein the voice command is provided by a person located outside the vehicle, and/or the transmitting of the signal to the vehicle is performed via a wireless communication.

8. A key-fob communicatively connected to a vehicle and configured for performing the method of claim 1, the key-fob comprising a microphone configured to receive the voice command.

9. The key-fob of claim 8, further comprising a button configured for activating and/or stopping the reception of the voice command.

10. A vehicle configured for performing the method of claim 1.

11. A system comprising:

a vehicle; and a key-fob communicatively connected to the vehicle, wherein the key-fob comprises a microphone configured to receive a voice command, wherein the system is configured for performing the method of claim 1.

* * * * *